US010489219B2

(12) United States Patent
Sachdev et al.

(10) Patent No.: US 10,489,219 B2
(45) Date of Patent: Nov. 26, 2019

(54) TRANSITIONING BETWEEN DATA STREAM PROCESSORS IN A PUBLISH-SUBSCRIBE SYSTEM

(71) Applicant: Microsoft Technology Licensing, LLC, Redmond, WA (US)

(72) Inventors: Sanjay Sachdev, San Jose, CA (US); Sean Peng, Richmond (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 481 days.

(21) Appl. No.: 15/271,522

(22) Filed: Sep. 21, 2016

(65) Prior Publication Data

US 2018/0081742 A1    Mar. 22, 2018

(51) Int. Cl.
*G06F 9/54*           (2006.01)
(52) U.S. Cl.
CPC .............. *G06F 9/542* (2013.01); *G06F 9/543* (2013.01)
(58) Field of Classification Search
CPC ................................ G06F 9/542; G06F 9/3851
See application file for complete search history.

(56) References Cited

U.S. PATENT DOCUMENTS

2017/0116050 A1* 4/2017 Thukkaram ............. G06F 9/542
2017/0195204 A1* 7/2017 Fournier ................ G06N 7/005

OTHER PUBLICATIONS

Krämer et al., "Dynamic Plan Migration for Snapshot-Equivalent Continuous Queries in Data Stream Systems" (2006) Current Trents in Database Techology EDBT 2006, pp. 497-516 [retrieved from http://dl.ifip.org/db/conf/edbtw/edbtw2006/KramerYCSP06.pdf].*

* cited by examiner

*Primary Examiner* — Brian W Wathen
(74) *Attorney, Agent, or Firm* — Hickman Palermo Becker Bingham LLP

(57) ABSTRACT

A data stream processors transition system which implements techniques for transitioning control from a first data stream processor to a second data stream processor. The data stream processors transition system preserves the integrity of data streams produced by first and second data stream processors when transitioning control between the first to the second data stream processors. For example, timestamp information may be provided to the first data stream processor that specifies when the first data stream processor may transfer control to the second data stream processor. The first data stream processor may process events by consuming and publishing results until the time specified by the timestamp information. The second data stream processor may, after the time specified by the timestamp information, process events by consuming and publishing results.

20 Claims, 4 Drawing Sheets

FIG. 3

TRANSITIONING BETWEEN DATA STREAM PROCESSORS IN A PUBLISH-SUBSCRIBE SYSTEM

TECHNICAL FIELD

The present disclosure relates to controlling the timing of transfer of data between processors and, more specifically, transferring of control between one or more processors. (SUGGESTED GROUP ART UNIT: 2447; SUGGESTED CLASSIFICATION: 709/205.)

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

There are massive amounts of information available using computer networks. The information may be represented as events in a computer system, which may come from one or more sources. One way for a computer to gather and make sense of the events is through a publish-subscribe environment. Some examples of information that may be events in the publish-subscribe environment include Webpage browsing information, feed information, emails, user interaction information, and many other pieces of information. In the publish-subscribe environment, events may be published from producers of information and selectively processed (or consumed) by data stream processors for subscribers.

An existing data stream processor may need to be replaced by a new data stream processor because a new technical environment is being used (e.g., a new programming language, a new technical foundation) or to provide additional features not available on the existing data stream processor. However, it is difficult to modify data stream processors once they are deployed. For example, there may exist state information at the existing data stream processor, which is difficult to retrieve, understand, and properly transition to the new data stream processor.

An example of one method to transfer control is to stop an existing data stream processor, determine and store state information of the existing data stream processor, then start a new data stream processor. This may add undesirable latency during the transition of the existing data stream processor to the new data stream processor, and increases risk of errors such as the replication factor, partitioning, and up/downtime. Further, events may not be received by the existing or new data stream processors in chronological order. This means that if an event is out of order, it may not be processed by the existing or the new data stream processor, since the existing data stream processor that is to process the event may never receive the event.

Therefore there is a need for an improved method to coordinate and synchronize transfer of control between data stream processors.

DETAILED DESCRIPTION

Figure 1:
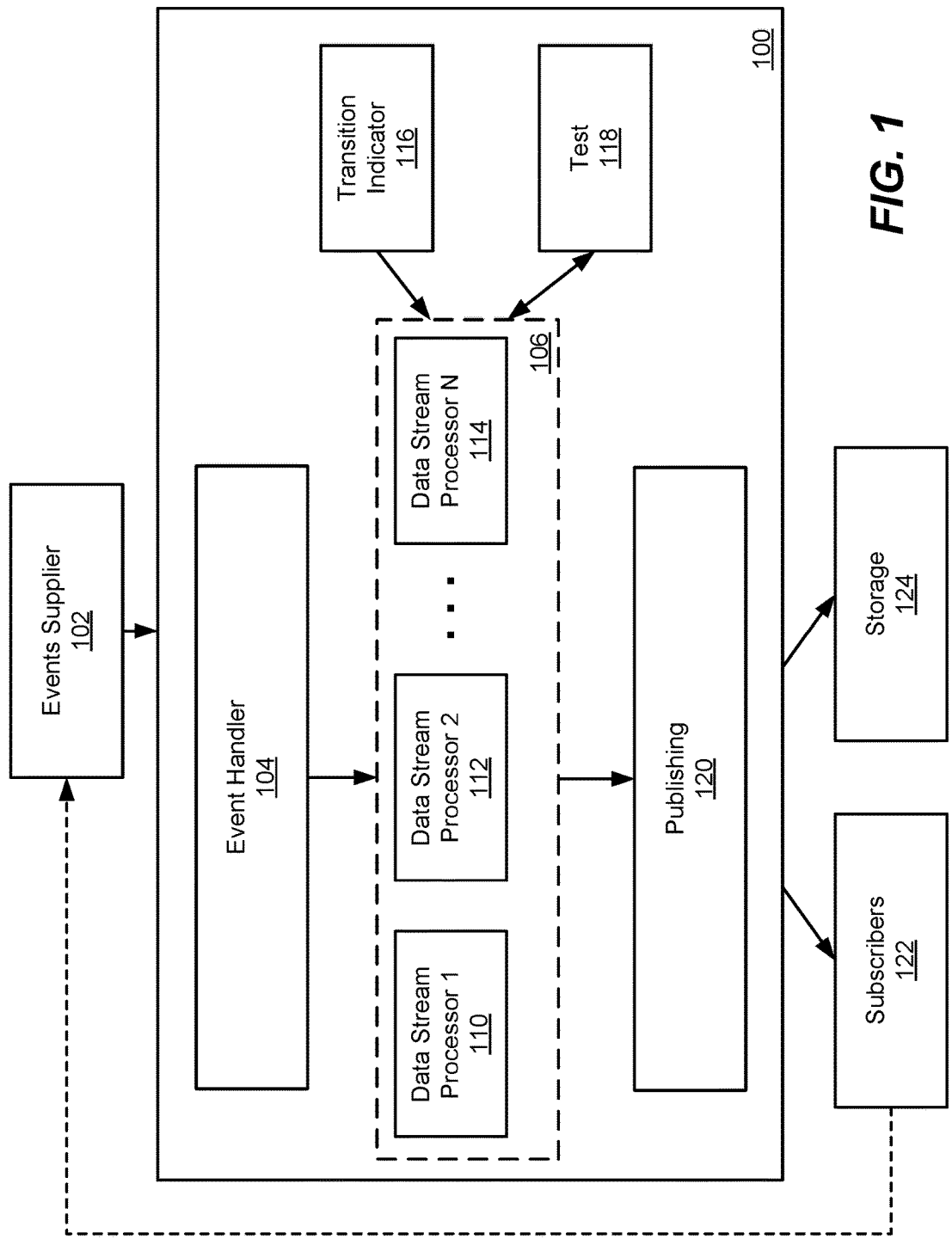
FIG. 1 illustrates a data stream processors transition system in which the techniques described may be practiced according to certain embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline. The outline and headings used in the outline are provided merely for reference purposes. Features discussed following each heading do not limit the features as being required by a specific embodiment identified by each heading and do not limit the features as solely belonging to any specific embodiment identified by each heading.

1.0 GENERAL OVERVIEW
    1.1 NEWS OR UPDATE FEED USE CASE
    1.2 CONTENT ITEM SELECTION USE CASE
    2.0 STRUCTURAL OVERVIEW
    3.0 EXAMPLE TIME CHART FOR A DATA STREAM PROCESSORS TRANSITION SYSTEM
      3.1 TIMING OF EVENTS RECEIVED AT DATA STREAM PROCESSORS
    4.0 EXAMPLE METHOD FOR A DATA STREAM PROCESSORS TRANSITION SYSTEM
    5.0 IMPLEMENTATION EXAMPLE—HARDWARE OVERVIEW 1.0 General Overview A data stream processors transition system is described herein which implements techniques for transitioning control from a first data stream processor to a second data stream processor. The data stream processors transition system preserves the integrity of data streams produced by the first and second data stream processors when transitioning control between the first to the second data stream processor. For example, timestamp information may be provided to the first data stream processor that specifies when the first data stream processor may transfer control to the second data stream processor. The first data stream processor may process events by consuming and publishing results until the time specified by the timestamp information. The second data stream processor may, after the time specified by the timestamp information, process events by consuming and publishing processed event results.

In an embodiment, the data stream processors transition system is configured so that the time ranges of operation for an existing data stream processor and a new data stream processor covers all points in time where processed event results are needed. This means that all points in time where processed event results are needed fall into the active (or publishing) time range of exactly one of the data stream processors. To transfer control, the time ranges may be configured so that the current time falls within the active time range of the existing data stream processor but at some point in the future the timestamps will fall into the active time range of the new data stream processor that should take over control.

In an embodiment, the data stream processors transition system is used in a publish-subscribe (or pub-sub) environment. In a pub-sub environment, a producer or publisher creates data (or events) that are then processed by a data stream processor for subscribers. The pub-sub environment allows for asynchronous messaging between multiple producers and multiple subscribers. The publishers do not need direct knowledge of which, if any, subscribers subscribe to their published events. Similarly, subscribers may subscribe to one or more publishers based on their interest, without subscribing to all publishers.

The publisher's events may include a timestamp, indicating when the event was created by the publisher, when the event was transmitted by the publisher, or other time associated with the events. The events are published by the publisher to a communication channel, such as a stream of data, allowing subscribers to subscribe to the producer's events via the communication channel.

Many different types of events may be published in a pub-sub environment. The following are two sample use cases with different types of events that may be used by the data stream processors transition system. Although the specification may employ examples using the two sample embodiments discussed below, the principles as described herein are generally applicable to other types of systems where there are events that are published and subscribed. For example, other use cases not described below may include a database system, a mailing list system, or many other systems.

1.1 News or Update Feed Use Case

In an embodiment, the data stream processors transition system is used with a news or update feed system. The news feed may include information from one or more sources of information, such as a news Website, users of one or more social networks, companies, or other sources of information. For example, the feed may be displayed as part of a Web page, included in an email digest of information, or otherwise presented to a user. A data stream processor executing as part of the update feed system or separately may use events from these sources by filtering the events to show to the user only those they have an interest in (e.g., sources the user liked, sources connected with the user) or determined by the feed system as potentially being of interest to the user.

When upgrading or changing from an existing to a new data stream processor, the data stream processors transition system ensures that there is no gap in information received by the user. For example, the user may only want to subscribe to events from their friends or other entities that are of interest to them. They may not want to miss any updates from their friends, even if the update feed system is being upgraded. They may also not want to receive duplicate published processed event results.

1.2 Content Item Selection Use Case

In an embodiment, the data stream processors transition system is used with a content item selection system. The content item selection system may be used to select from a variety of content item types for a user. Some examples of content item types may include text, video, picture, or a combination of any of these. The content item selection system may also select content items for the user for different purposes such as for advertising or suggesting interesting content items for the user.

Content items may be selected for a user based on events that the user has published. For example, a user may interact with their computer in various ways. A part of these interactions may be relevant to the content selection system. The user's computer may publish these interactions by the user directly, or these interactions may be sent to a server or other computer where information on the interactions is published. An instance of a data stream processor executing as part of the content selection system or separately may use this interaction information to properly understand what the user is doing and what content items of the content item selection system the user may be interested in.

Some examples of events and possible processed event results the events by a data stream processor in a content selection system are described in greater detail in Table 1 below.

TABLE 1

| Event | Produced Processed Event Results |
|---|---|
| Item Impression Event: when a content item is shown to a user (e.g., when the user loads a Web page and is presented a content item) | user interaction event (e.g., display additional content items) resource event to modify a resource amount (e.g., budget, revenue, or other) associated with the content item direct communication from the content item selection system to the user (e.g., through messaging, email, or other) |
| Item Selection Event: when a content item shown to a user is selected by the user (e.g., clicking, hovering over using a content item displayed) | user interaction event resource event to modify a resource amount associated with the content item direct communication from the content item selection system to the user (e.g., through messaging, email, or other) |
| Lead Generation Event: when a user indicates to the content selection system or other system that they are interested in a content item | direct communication from the content item selection system to the user (e.g., through messaging, email, or other) |

2.0 Structural Overview

FIG. 1 illustrates a data stream processors transition system 100 in which the techniques described may be practiced according to certain embodiments. The data stream processors transition system 100 is a computer-based system. The various components of the data stream processors transition system 100 are implemented at least partially by hardware at one or more computing devices, such as one or more hardware processors executing instructions stored in one or more memories for performing various functions described herein. For example, descriptions of various components (or modules) as described in this application may be interpreted as providing pseudocode, an informal high-level description of one or more computer structures. The descriptions of the components may be converted into software code, including code executable by an electronic processor. The data stream processors transition system 100 illustrates only one of many possible arrangements of components configured to perform the functionality described herein. Other arrangements may include fewer or different components, and the division of work between the components may vary depending on the arrangement.

An events supplier component 102 is responsible for supplying events to the data stream processors transition system 100. The events supplied to the data stream processors transition system 100 may include events from any entity, including persons, companies, groups, organization, and non-entities, such as computing devices. An event handler component 104 of the data stream processors transition system 100 is responsible for receiving event information and distributing events from the event supplier component 102 to one or more data stream processors of a set of data stream processors 106. The set of data stream processors 106 may include a data stream processor 1 110, and a data stream processor 2 112. Any number of additional data stream processors may also be executing in the data stream processors transition system 100, as represented by a data stream processor N 114.

When a data stream processor of the data stream processors transition system 100 receives one or more events, one or more actions may result from each of the events. A non-exhaustive list of actions the data stream processor may perform when consuming an event include:

Action 1. The data stream processor consumes and extracts relevant data from the event. A table or other type of data storage structure is updated. For example, information from the event is inserted as a new row to a table. The data stream processor logs exceptions/errors and continues.

Action 2. The data stream processor consumes the event. Various operations are performed on information from the event, and the information is filtered for relevance. All or only part of the content of an event may be relevant for the data stream processor. The information is decorated if needed. To decorate the processed event result, information from the event is formatted, modified, or otherwise changed without changing the content of the event so that an intended subscriber may use the processed event. For example, a header or a data container format is modified. The processed event result is published. In an embodiment, action 2 may include creating a new event, based on the consumed event. The new event may be returned to the data streams processors transition system 100, for additional processing.

Action 3. The data stream processor consumes the event, then executes an operation in response to the event. Some examples of operations including sending an electronic message (e.g., email, internal messaging service, instant messaging service, home Web page message) or other type of operation.

Action 4. Any combination of actions 1, 2, or 3.

For example, in response to an event consumed at a data stream processor, the data stream processor may update table or other state information of the data stream processor (action 1), yet not publish the processed event result (action 2). As another example, in response to an event consumed at a data stream processor, the data stream processor may publish the processed event result (action 2) and send an indication to include a message to a user (action 3).

In an embodiment, the data stream processors transition system 100 includes a data stream processor that may choose to not publish a processed event result even when it would regularly do so. For example, if a new data stream processor consumes an event that generally involves publishing a processed event result, it may choose to not do so (e.g., since a time for transfer of control with an existing data stream processor has not yet been reached). This prevents unnecessary published process event results by more than one data stream processor for a particular event.

In an embodiment, the data stream processors transition system 100 does not include the event handler component 104. Each data stream processor of the set of data stream processors 106 includes a listener that determines, based on events transferred to the data stream processors on an information bus, whether a particular event corresponds to a particular data stream processor. If the particular event does not correspond to the particular data stream processor, then the particular data stream processor may ignore the particular event.

In an embodiment, the set of data stream processors 106 is located across one or more physical data centers. For example, the data stream processor 1 110 may be executing on a first data center while the data stream processor 2 112 is executing on a second data center. Each data stream processor may also be executing on one or more data centers. For example, the data stream processor 1 110 may be executing on a first data center and a second data center, where information is exchanged between the first data center and the second data center when executing the data stream processor 1 110.

A transition indicator component 116 is responsible for indicating to data stream processors of the set of data stream processors 106 when the data stream processor starts listening for events, when the data stream processor is to publish processed event results for events, when the data stream processor is to stop publishing processed event results for events, when the data stream processor should stop executing, when the data stream processor should stop listening for events, or any combination of these. For example, the transition indicator component 116 may provide, to two or more data stream processors of the set of data stream processors 106, timestamp information that indicates when a data stream processor should stop listening for events and when another data stream processor should start publishing processed event results.

A test component 118 is responsible for testing whether any of the data stream processors of the set of data stream processors 106 is operating properly. There may be different criteria analyzed by the test component 118 to determine whether a specific data stream processor is operating properly. In one test, the data stream processors transition system 100 may compare processed event results from one data stream processor with processed event results from another data stream processor. For example, the data stream processor 1 110 may be tested to determine whether the processed event results would be the same as the processed event results from the data stream processor 2 112, near a particular time when control is to be transferred from the data stream processor 1 110 to the data stream processor 2 112. If the processed event results from the data stream processor 1 110 and the data stream processor 2 112 are the same, the test is passed. The processed event results may or may not need to be published in order to test whether the processed event results would be the same. Another test the test component 118 may execute is whether a data stream processor of the set of data stream processors is operating within specified parameters. For example, if the data stream processor 1 110 has been unable to perform under certain time, memory, or other system requirements, the test component 118 may indicate that the operation of the data stream processor 1 110 does not meet operating requirements.

In an embodiment, the test component 118 includes allowing the data stream processors transition system 100 to perform a "roll-back" operation. For example, if the data stream processors transition system 100 has transitioned from the data stream processor 1 110 to the data stream processor 2 112 but errors have appeared, then the data stream processors transition system 100 may facilitate the transfer of control from the data stream processor 2 112 to the data stream processor 1 110 until the reason(s) for the errors have been determined and rectified.

A publishing component 120 is responsible for publishing processed event results from the set of data stream processors 106. The publishing component 120 may publish to subscribers indicated in a subscribers component 122, update one or more data stores in a storage component 124, or a combination of these. A subscriber may be any type of entity (e.g., persons, organization, companies) or other computing devices. A subscriber of the subscribers component 122 may also include one or more data stream processors of the set of data stream processors 106. In this case, the subscriber provides published processed event results to the events supplier component 102. The storage component 124 may include tables and other data storage structures to store information published by the set of data stream processors 106. The information stored by the storage component 124 may be processed for additional analysis or for later use.

3.0 Example Time Chart for a Data Stream Processors Transition System

In an embodiment, the data stream processors transition system 100 includes data stream processors that are configured with at least one time range (start and end time) during which it operates. Configuration instructions may be supplied to data stream processors indicating the at least one time range, which do not require terminating executing instances of the data stream processors in order to be applied. Each start and end time may be represented using an integer timestamp. The timestamp corresponds to a single time scheme to which the data stream processors are synced, such as epoch time, Greenwich Mean Time, or other time. When the end time is unknown, the end time may be represented as an arbitrary large value. This large valve represents a time far enough in the future to represent infinity.

Figure 2:
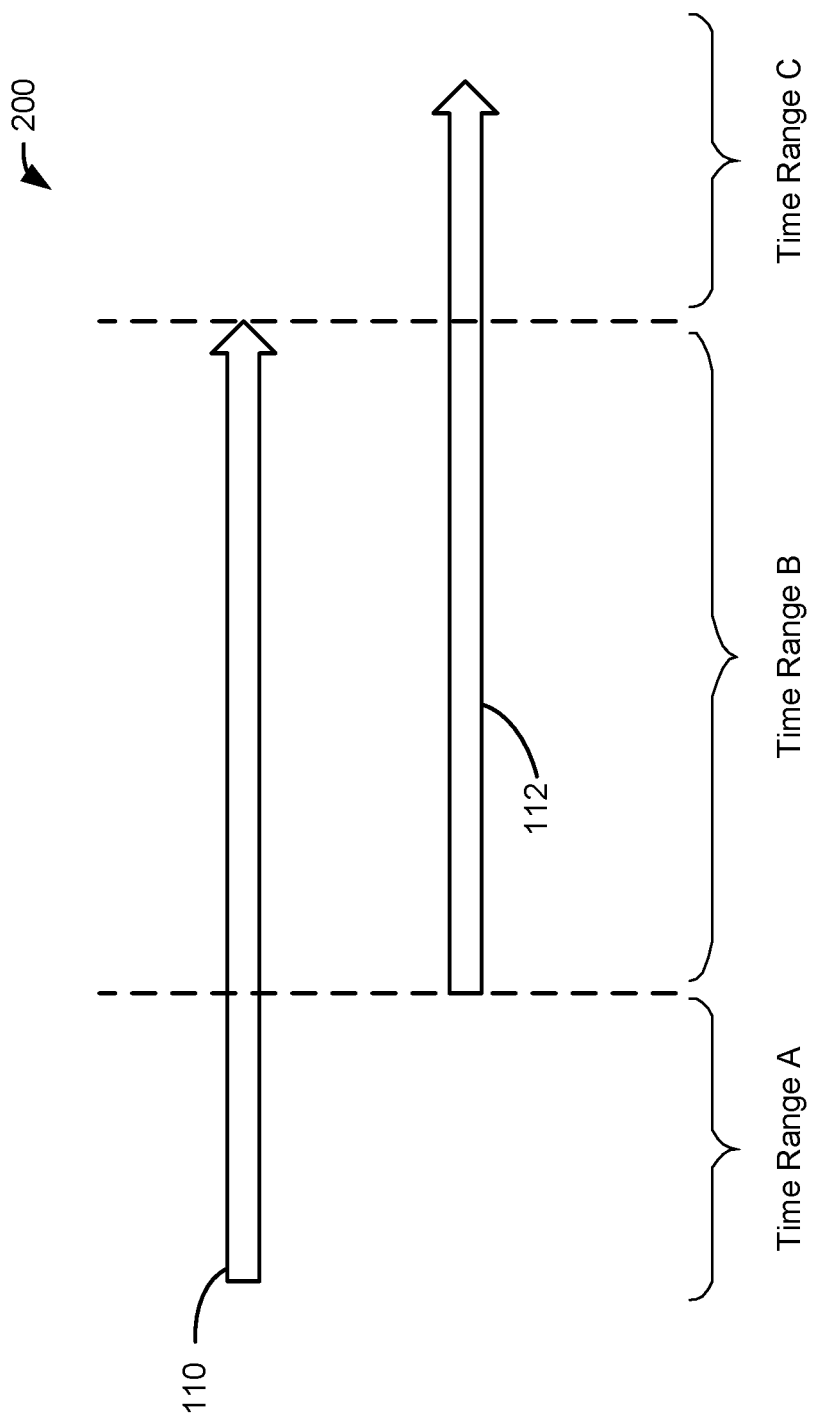
FIG. 2 is a time chart that illustrates an example method of performing a data stream processor transition.

FIG. 2 is a time chart 200 that illustrates an example method of performing a data stream processor transition. FIG. 2 includes the data stream processor 1 110 and the data stream processor 2 112 and illustrates a transfer of control from the data stream processor 1 110 to the data stream processor 2 112. FIG. 2 includes three sequential times ranges: time range A, time range B, and time range C. Although only two data stream processors are shown in FIG. 2, there may be any number of data stream processors executing during the time ranges A, B, or C.

In the time chart 200, the data stream processor 1 110 consumes events with timestamp information during the time ranges A and B. The data stream processor 2 112 consumes events with timestamp information during the time ranges B and C. One or more events with timestamps may occur during the time ranges A, B, or C. The data stream processor 1 110 may be turned off or the executing instance of data stream processor 1 110 may be terminated during time range C. Similarly, the data stream processor 2 112 may be turned off or the executing instance of data stream processor 2 112 may have not been started during time range A.

In an embodiment, the data stream processor 1 110 is functionally equivalent to the data stream processor 2 112. For example, the data stream processor 1 110 and the data stream processor 2 112 may consume the same events and produce the same processed event results from the same events. This may occur where the data stream processor 2 112 is an upgrade or a new version of the data stream processor 1 110.

Alternate embodiments may include the data stream processor 1 110 that is not functionally equivalent to the data stream processor 2 112. For example, certain features of data stream processor 1 110 may no longer be needed while other features are maintained, resulting in different processed event results from the data stream processor 1 110 and the data stream processor 2 112. In another example, certain features may be added to the data stream processor 2 112 that were not previously present in the data stream processor 1 110. This may result in functional equivalence for certain events, but different for other events when comparing processed event results from the data stream processor 2 112 to the data stream processor 1 110.

During time range B, the data stream processors transition system 100 may begin transitioning control of publishing processed event results from the data stream processor 1 110 to the data stream processor 2 112. In an embodiment, during time range B, the data stream processor 1 110 and the data stream processor 2 112 may publish information during time range B. The data stream processors transition system 100 may gradually transfer control from the data stream processor 1 110 to the data stream processor 2 112 in incremental steps, such that the data stream processor 112 would start by consuming and publishing a certain percentage of the events that gradually rises until complete control is transferred from the data stream processor 1 110 to the data stream processor 2 112 during time range C. For example, during time range B, the data stream processor 1 110 may be publishing events with user names starting from A-K while the data stream processor 2 112 may publish events with user names starting from L-Z, while both consume all events. In alternate embodiments, although both the data stream processor 1 110 and the data stream processor 2 112 are executing during time range B, only the data stream processor 1 110 is publishing information during time range B. This prevents possible duplication of published processed event results.

In an embodiment, the data stream processors transition system 100 chooses an appropriate length of time for the time range B. A longer time range may allow an existing and new data stream processor to synchronize state information before control is transferred. However, extending the time range B may lead to unnecessary use of computing resources and prevent the proper debugging of the new data stream processor. Various embodiments of the data stream processors transition system 100 may use different lengths of time for the time range B. Depending on how often events in the data stream processors transition system 100 are received, the length of time for time range B may be from seconds (e.g., 10 seconds, 15 seconds) to minutes (e.g., 1 minute, 2 minutes).

3.1 Timing of Events Received at Data Stream Processors

In an embodiment, the data stream processors transition system 100 includes events that are received by data stream processors during different times. FIG. 2 shows events that occur during the time ranges A, B, or C. However, events may not be received by the data stream processors in such a chronological order. For example, the data stream processor 1 110 and the data stream processor 2 112 receive an event. The event does not need to be received by the data stream processor 1 110 and the data stream processor 2 112 at the same time. Further, the data stream processor 1 110 and the data stream processor 2 112 may receive events in a different order. For example, the data stream processor 1 110 may receive a selected event before another event, but the data stream processor 2 112 may receive the selected event after the other event. This may occur as a result of many different reasons such as network congestion, a data stream processor backlog, or hardware limitations of the data stream processor computing system.

4.0 Example Method for a Data Stream Processors Transition System

Figure 3:
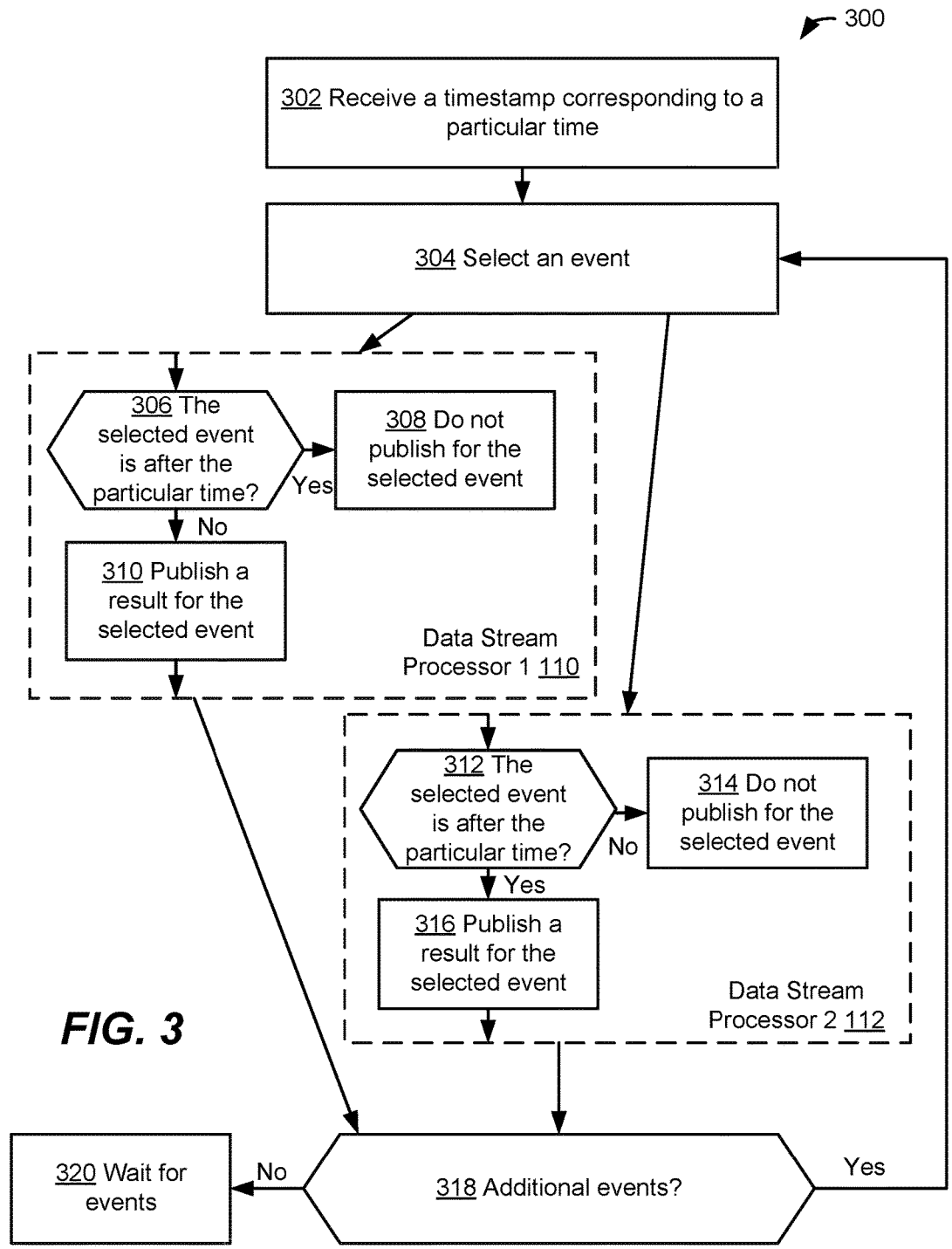
FIG. 3 is a flow that illustrates an example method for a data stream processors transition system.

For purposes of illustrating a clear example, FIG. 3 is described herein in the context of FIG. 1, but the broad principles of FIG. 3 can be applied to other systems having configurations other than as shown in FIG. 1. Further, FIG. 3 illustrates an algorithm or plan that may be used as a basis for programming one or more of the components of FIG. 1 that relate to the functions that are illustrated in the diagram, using a programming development environment or programming language that is deemed suitable for the task.

Thus, FIG. 3 is intended as an illustration at the functional level at which skilled persons, in the art to which this disclosure pertains, communicate with one another to describe and implement algorithms using programming. This diagram is not intended to illustrate every instruction, method object or sub step that would be needed to program every aspect of a working program, but are provided at the high, functional level of illustration that is normally used at the high level of skill in this art to communicate the basis of developing working programs.

FIG. 3 is a flow 300 that illustrates an example method for a data stream processors transition system 100.

In step 302, the data stream processors transition system 100 receives a timestamp corresponding to a particular time. The timestamp may include various pieces of information that indicate when a data stream processor should start publishing processed event results. In an embodiment, the particular time corresponds to the period between time range B and time range C of FIG. 2.

In step 304, the data stream processors transition system 100 selects an event, such as an event from a plurality of events, to transmit to the data stream processor 1 110 and the data stream processor 2 112.

In step 306, the data stream processor 1 110 of the data stream processors transition system 100 determines whether the timestamp indicated in the selected event is after the particular time. If so, then in step 308, the data stream processor 1 110 of the data stream processors transition system 100 does not publish anything for the selected event.

If the timestamp indicated in the selected event is before the particular time, then, in step 310, the data stream processor 1 110 of the data stream processors transition system 100 processes the selected event and publishes a processed event result for the selected event.

Similar to data stream processor 1 110, the data stream processor 2 112 of the data stream processors transition system 100 receives the same events. In step 312, the data stream processor 2 112 of the data stream processors transition system 100 determines whether the timestamp indicated in the selected event is before the particular time. If so, then, in step 314, the data stream processor 2 112 of the data stream processors transition system 100 does not publish anything for the selected event. Although the data stream processor 2 112 does not publish a processed event result, it may update state or other information associated with the data stream processor 2 112, based on the selected event.

If timestamp indicated in the selected event is after the particular time, then, in step 316, the data stream processor 2 112 of the data stream processors transition system 100 processes the selected event and publishes a processed event result for the selected event.

In step 318, the data stream processors transition system 100 determines whether there are additional events. If there are additional events, then the data stream processors transition system 100 may return to step 304 to process additional events. If there are no additional events, then, in step 320, the data stream processors transition system 100 waits for additional events. Events processed by the data stream processors transition system 100 after step 320 may be processed by the data stream processor 2 112 without processing by the data stream processor 1 110.

In an embodiment, each event of the plurality of events are processed by at least one of data stream processor 1 110 or the data stream processor 2 112. This occurs irrespective of whether the plurality of events are received at the data stream processor 1 110 or the data stream processor 2 112 out of chronological order specified by the timestamp included with each respective event. For example, the data stream processor 110 may publish processed event results for a first event that occurs before the particular time, even after receiving a second event that occurs after the particular time.

5.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
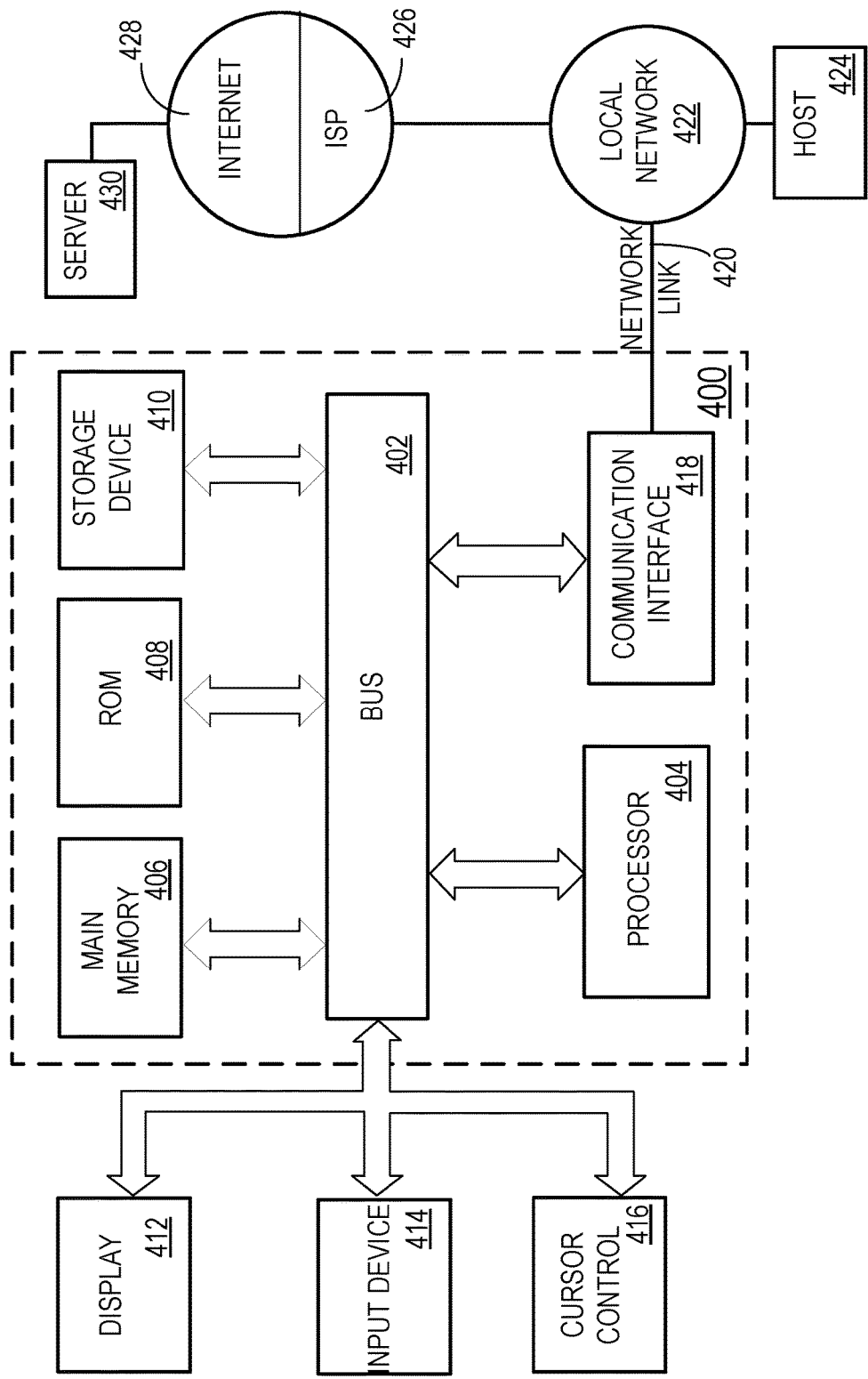
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (for example, x) and a second axis (for example, y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   one or more hardware processors;
   one or more storage media storing instructions which, when executed by the one or more hardware processors, cause:
   storing timestamp data that indicates a particular time;
   providing the timestamp data to a first data stream processor and a second data stream processor;
   before receiving, by the first data stream processor and the second data stream processor, a plurality of events, executing configuration changes to the first data stream processor and the second data stream processor on when to begin and when to stop publishing a processed event result of each event of the plurality of events;
   receiving, by the first data stream processor, the plurality of events, wherein each event includes a timestamp,
   for each event in the plurality of events, the first data stream processor:
      determining whether said each event indicates a first time that is before the particular time, and
      publishing, from the first data stream processor, a first processed event result of said each event if the first time is before the particular time;
   receiving, by the second data stream processor, the plurality of events,
   for each event in the plurality of events, the second data stream processor:
      determining whether said each event indicates a second time that is after the particular time, and
      publishing, from the second data stream processor, a second processed event result of said each event if the second time is after the particular time.

2. The system of claim 1, wherein the instructions, when executed by the one or more hardware processors, further cause:
after the particular time indicated in the timestamp data, determining to not receive additional events at the first data stream processor.

3. The system of claim 1, wherein the instructions, when executed by the one or more hardware processors, further cause:
for an event occurring after events of the plurality of events, publishing, by the second data stream processor, a third processed event result of the event, without a corresponding receiving by the first data stream processor of the event.

4. The system of claim 1, wherein the plurality of events includes a terminating event and the instructions, when executed by the one or more hardware processors, further cause:
receiving, by the first data stream processor, the terminating event;
after receiving the terminating event, determining to not receive additional events at the first data stream processor.

5. The system of claim 1, wherein a first event of the plurality of events is produced by a third data stream processor that is different than the first data stream processor and the second data stream processor, wherein the first event is received by the first data stream processor.

6. The system of claim 1, wherein the plurality of events includes a first event, wherein the instructions, when executed by the one or more hardware processors, further cause:
receiving, by the first data stream processor, the first event;
receiving, by the second data stream processor, the first event;
publishing a result of the first event, from only the first data stream processor or only the second data stream processor.

7. The system of claim 6, wherein the first event includes a first timestamp and the instructions, when executed by the one or more hardware processors, further cause:
determining the first timestamp indicates a third time that is before the particular time;
determining to publish a result of the first data stream processor for the first event.

8. The system of claim 6, wherein the first event includes a first timestamp and the instructions, when executed by the one or more hardware processors, further cause:
determining the first timestamp indicates a third time that is before the particular time;
based on the first event received by the second data stream processor, updating state information associated with the second data stream processor.

9. The system of claim 1, wherein, at the particular time, receiving an event at the first data stream processor and the second data stream processor produces the same processed event result.

10. The system of claim 1, wherein the plurality of events comprise events generated by one or more publishers and the first data stream processor and the second data stream processor are subscribers to the one or more publishers.

11. The system of claim 1, wherein an event of the plurality of events comprises at least one of transmitting an electronic message communication, a content item, or a user interaction by a user on a Web page.

12. The system of claim 1, wherein the first data stream processor and the second data stream processor are configured to listen to the same data sources.

13. The system of claim 1, wherein the plurality of events includes a first event and a second event, and the instructions, when executed by the one or more hardware processors, further cause:
receiving, by the first data stream processor, the first event before the second event;
receiving, by the second data stream processor, the second event before the first event.

14. The system of claim 1, wherein the plurality of events includes a first event and a second event and the first event includes a timestamp indicating a time before a timestamp of the second event, and the instructions, when executed by the one or more hardware processors, further cause:
receiving by the first data stream processor or the second data stream processor, the second event, before receiving the first event.

15. A method comprising:
storing timestamp data that indicates a particular time;
providing the timestamp data to a first data stream processor and a second data stream processor;
before receiving, by the first data stream processor and the second data stream processor, a plurality of events, executing configuration changes to the first data stream processor and the second data stream processor on when to begin and when to stop publishing a processed event result of each event of the plurality of events;
receiving, by the first data stream processor, the plurality of events, wherein each event includes a timestamp,
for each event in the plurality of events, the first data stream processor:
determining whether said each event indicates a first time that is before the particular time, and
publishing, from the first data stream processor, a first processed event result of said each event if the first time is before the particular time;
receiving, by the second data stream processor, the plurality of events,
for each event in the plurality of events, the second data stream processor:
determining whether said each event indicates a second time that is after the particular time, and
publishing, from the second data stream processor, a second processed event result of said each event if the second time is after the particular time.

16. The method of claim 15, further comprising:
after the particular time indicated in the timestamp data, determining to not receive additional events at the first data stream processor.

17. The method of claim 15, further comprising:
for an event occurring after events of the plurality of events, publishing, by the second data stream processor, a third processed event result of the event, without a corresponding receiving by the first data stream processor of the event.

18. One or more storage media storing instructions which, when executed by one or more processors, cause:
storing timestamp data that indicates a particular time;
providing the timestamp data to a first data stream processor and a second data stream processor;
before receiving, by the first data stream processor and the second data stream processor, a plurality of events, executing configuration changes to the first data stream processor and the second data stream processor on when to begin and when to stop publishing a processed event result of each event of the plurality of events;

receiving, by the first data stream processor, the plurality of events, wherein each event includes a timestamp, for each event in the plurality of events, the first data stream processor:
  determining whether said each event indicates a first time that is before the particular time, and
  publishing, from the first data stream processor, a first processed event result of said each event if the first time is before the particular time;

receiving, by the second data stream processor, the plurality of events, for each event in the plurality of events, the second data stream processor:
  determining whether said each event indicates a second time that is after the particular time, and
  publishing, from the second data stream processor, a second processed event result of said each event if the second time is after the particular time.

19. The one or more storage media storing instructions of claim 18, wherein a first event of the plurality of events is produced by a third data stream processor that is different than the first data stream processor and the second data stream processor, wherein the first event is received by the first data stream processor.

20. The one or more storage media storing instructions of claim 18, wherein the instructions, when executed by the one or more processors, further cause:
  for an event occurring after events of the plurality of events, publishing, by the second data stream processor, a third processed event result of the event, without a corresponding receiving by the first data stream processor of the event.

* * * * *